United States Patent [19]

Ish-Shalom et al.

[11] Patent Number: 4,618,808
[45] Date of Patent: Oct. 21, 1986

[54] ELECTROMAGNETIC ACTUATOR SYSTEM USING STEPPER MOTOR WITH CLOSED LOOP POSITION SENSING, ELECTRONIC COMMUTATION AND DYNAMIC POSITION AND ANOMALY CORRECTION

[75] Inventors: Jehuda Ish-Shalom, Croton-on-Hudson; Leonard A. Katz, Yorktown Heights; Dennis G. Manzer, Bedford Hills, all of N.Y.

[73] Assignee: International Business Machines Corporation, Armonk, N.Y.

[21] Appl. No.: 696,568

[22] Filed: Jan. 30, 1985

[51] Int. Cl.[4] .............................................. H02P 8/00
[52] U.S. Cl. ..................................... 318/696; 318/685
[58] Field of Search ............... 318/696, 685, 341, 609, 318/610

[56] References Cited

U.S. PATENT DOCUMENTS

| | | | |
|---|---|---|---|
| 4,078,192 | 3/1978 | Fultz | 318/227 |
| 4,137,491 | 1/1979 | Bartley et al. | 318/685 |
| 4,404,509 | 9/1983 | Hartwig | 318/685 |

Primary Examiner—William M. Shoop, Jr.
Assistant Examiner—Saul M. Bergmann

Attorney, Agent, or Firm—Carl C. Kling

[57] ABSTRACT

Using as an actuator a stepper motor operated in a position-sensed closed loop mode via an electronic commutator by position and anomaly corrected motion control signals provided by a programmable logic array and by a microprocessor, provides a precision power positioner. The correct enabling of the motor coils, based on position sensing of the motor phase, using electronic commutation for the stepper motor, transforms the problem of enabling coil selection to the programmable logic array, which by its logic provides a simplified operating control as a function of present armature position feedback, and by a microprocessor corrects for anomalies such as temperature rise, square-law, and phase increase as a function of position desired and present armature position feedback signals, and thus provides high positional accuracy, high speed and force (torque) control independent of the motor cardinal step positions. A standard three phase magnetic resistor sensor is used both to sense the motor phase and to feed back the motor position to the microprocessor for calculation of corrections; actual control of the stepper motor is communicated as a single amplitude modulated control signal.

4 Claims, 8 Drawing Figures

"HALF STEP" STEPPING MOTOR CONTROL

STATIC FORCE vs POSITION
FOR FIXED COIL CURRENT

ELECTROMAGNETIC ACTUATOR SYSTEM USING STEPPER MOTOR WITH CLOSED LOOP POSITION SENSING, ELECTRONIC COMMUTATION AND DYNAMIC POSITION AND ANOMALY CORRECTION

BACKGROUND OF THE INVENTION

1. Field of the Invention

This invention relates to an electromagnetic actuator system, and more particularly relates to an electromagnetic actuator system using a stepper motor operated in a position-sensed double closed loop mode, via an electronic commutator, by dynamic position and anomaly corrected control provided by a computer as a single amplitude-variable input signal.

2. Description of the Prior Art

To generate torque an ordinary D.C. motor has many windings which are automatically switched on or commutated at the appropriate time by brushes, or in a brushless D.C. motor by a position sensor and electronic switches.

Stepping motors have a high force or torque output. Since they can produce this torque at very low speeds they are quite attractive as direct drive actuators for robots. Unfortunately, the common "control" schemes for stepping motors use sequencing logic which can only position the motors at their cardinal step positions. This conventional control does not operate well at high speeds or with varying loads. For a direct drive application it is desirable that the stepping motor position itself between cardinal steps. The usual approach of "microstepping", providing equilibrium point between cardinal step positions through a balancing choice of coil currents, is cumbersome, doesn't account for motor dynamics, and is wasteful of power. Secondly, control of delivered torque or force is a desirable trait in a robot actuator, but such control is difficult with conventional stepper motor control laws. Motor control laws known for DC servomotors have heretofore not been conveniently applied to stepper motors.

The following are representative of the prior art:

PUBLICATIONS

L. Thompson and M. Lee, "Universal Brush less Motor Commutator," Proc of Thirteenth Annual Symp on Incremental Motion Control Systems and Devices, University of Illinois, May 1984.

C. Oudet, "DC Versus Stepper: A New Approach," Proc of Thirteenth Annual Symp. on Incremental Motion Control Systems and Devices, University of Illinois, May 1984, shows how to convert a permanent magnet stepper motor to a DC motor, but still the implementation requires motor motion to detect the motor phase and thus there is no true DC coupling between the motor phase sensor and the coil switching circuits. There is a discussion of the basic theory of permanent magnet stepper motors.

R. Welburn, "Ultra High Torque System for Direct Drive Robotics," Robot 8 Conference, Detroit USA, June/1984, shows a synchronous motor with electronic commutator and twelve bit digital position feedback, but does not have square-root compensation and uses a complex commutator.

W. R. Pearson and Paresh C. Sen, "Brushless DC Motor Propulsion Using Synchronous Motors for Transit Systems," IEEE Transactions on Industrial Electronics, Vol. IE-31, No. 4, November 1984, shows an electronic commutator for synchronous motors.

J. P. Pawletko, "Dynamic Responses and Control Aspects of Linear Stepping Motors," Proc of Fifth Annual Symp on Incremental Motion Control Systems and Devices, University of Illinois, May 1976, shows an experimental motor and summarizes control techniques in stepper motors.

J. P. Pawletko and H. D. Chai, "Linear Stepping Motor with Uncoupled Phases," Proc of Thirteenth Annual Symp. on Incremental Motion Control Systems and Devices, University of Illinois, May 1984, pp. 245–250, shows another experimental motor.

The RRA card (Robotic Research Attachment) is a Motorola 68000 microprocessor and peripheral board designed to attach to the IBM Series 1.

B. C. Kuo, *Theory and Applications of Step Motors,* West Publishing Co., 1974.

R. H. Taylor, P. D. Summers and J. M. Meyer, "AML: A Manufacturing Language," *International Journal of Robotics Research,* Vol. 1, No. 3, Fall 1982.

M. J. Balas and E. J. Hamman, "Feedback Control of D.C. Stepping Motors, Superior Electric Company, 1984, pp. 141–148, shows a closed loop feedback model for a D.C. stepping motor.

PATENTS

U.S. Pat. No. 3,548,274, Mako, STEPPING MOTOR SPEED CONTROL, Dec. 15, 1970, shows a capacitive electronic commutator for a stepping motor.

U.S. Pat. No. 3,636,429, Jakubowski et al., LOGIC CIRCUITRY FOR PROVIDING STEPPING CONTROL FOR STEPPING MOTORS, Jan. 18, 1972, shows a closed loop system for controlling the stopping sequence in stepper motor operation.

U.S. Pat. No. 3,766,459, McIntosh et al., ELECTRONIC STEPPING DRIVE FOR DC TORQUE MOTOR, Oct. 16, 1973, shows operation of a DC servomotor using a digital to analog converter to convert step pulses to analog amplitude input. U.S. Pat. No. 4,025,837, Meier et al., ADAPTIVE CONTROL CIRCUIT FOR A STEPPING MOTOR, May 24, 1977, shows a technique to move in minimum time by controlling the proportion of acceleration signals to deceleration signals, using position feedback summed with the analog input to avoid overshoot.

U.S. Pat. No. 4,042,868, Rhodes, STEPPER MOTOR CONTROL APPARATUS, uses position feedback in a motor control circuit with duty cycle control.

U.S. Pat. No. 4,078,192, Fultz, SYNTHESIZER FOR MULTIPHASE WAVEFORMS, Mar. 7, 1978, shows the use of a PLA in control of a two-phase induction motor.

U.S. Pat. No. Re. 31,229 (U.S. Pat. No. 4,136,308) King, STEPPING MOTOR CONTROL, May 3, 1983, shows operation of a stepping motor using an electronic commutator from a DC power source, using back EMF in the stator coils to sense rotor position.

U.S. Pat. No. 4,137,491, Bartley et al, STEPPER MOTOR WITH ANALOG POSITIONING, Jan. 30, 1979, shows a technique for moving a stepping motor to predetermined stop positions other than its regular detent positions, using a motor control microprocessor together with a position sensor and a stop circuit. The system senses the present distance from a predetermined stop position and generates a position/velocity signal controlling the approach to the stop position. Bartley uses analog techniques to relate actual coil currents to calculate coil currents during the approach to the predetermined stop position.

U.S. Pat. No. 4,158,800, Jahelka et al., CONTROL SYSTEM, June 19, 1979, shows a stepper motor with a closed loop feedback system, using a coded disk for position feedback, and providing for speed change by varying lead angle.

U.S. Pat. No. 4,187,455, Martin, STEPPER MOTOR FEEDBACK IN POSITION SERVO LOOP, Feb. 5, 1980, shows a digitalized position feedback for subtraction from a digital position on command word so as to generate a position error signal to drive the stepper motor in a servo loop.

U.S. Pat. No. 4,254,370, Miller, CLOSED LOOP POSITIONER FOR A STEPPING MOTOR DRIVEN BY A BUFFERED TRANSLATOR, Mar. 3, 1981, shows the use of a buffered translator as a commutator, with position feedback, to operate the stepper motor at its inherent speed even though demand is for greater speed.

U.S. Pat. No. 4,349,771, Buxton, STEPPER MOTOR CONTROL CIRCUIT, Sept. 14, 1982, shows a closed loop system using an integrator system to compare a demand signal with a shaft position signal.

U.S. Pat. No. 4,426,608, Larson et al, STEPPING MOTOR CONTROL SYSTEM, Jan. 17, 1984, shows modulation of lead angle in accordance with a selected duty cycle, using optical position sensing.

U.S. Pat. No. 4,429,268, Yajima et al., SPEED CONTROL FOR STEP MOTORS, Jan. 31, 1984, shows position feedback and electronic commutation in a closed loop speed control, using acceleration and deceleration control memory.

U.S. Pat. No. 4,404,509, Hartwig, DEVICE FOR CONTROLLING THE DRIVE OF A STEPPING MOTOR, TO ADJUST THE LATERAL STITCH BIGHT AND/OR THE FEED LENGTH OF A SEWING MACHINE, Sept. 13, 1983, shows operation of a stepping motor using a control law PID (Proportional, Integral, Derivative) for solving the problem of current regulation in the winding of a stepper motor, but does not show use of control law PID for motion or position control.

The prior art, while it shows various electronic commutator or direct electronic control schemes for position feedback closed loop control of motors, does not teach nor suggest the invention, which is a double closed loop stepper motor system.

SUMMARY OF THE INVENTION

Using position feedback, a stored program microprocessor computes appropriate stepper motor position and also computes corrections for known anomalies, as a combined function of the present armature position and demand armature position, and supplies phase control signals to a programmable logic array, (PLA). The PLA also receives position feedback, and controls an electronic commutator which completes a path for enabling currents in the coils of the stepper motor. The achieves very high speed, high power precision actuation at low cost. A single microprocessor output signal, presented as an amplitude-variable servo demand control amplitude signal (corrected both for position and known anomalies such as square-law losses) controls speed, torque and position of the stepper motor. Position control is precise to an incremental fraction of a cardinal step. All manipulation of control signals, prior to presentation as a single amplitude-variable control amplitude signal, is done by low-power logical devices.

The object of the invention is to utilize the power and economy of stepping motor actuators in high precision assignments, with dynamic control by a single current (voltage) control amplitude.

Another object of the invention is to make possible a practical electronic commutator system for a stepper motor, with motor control by a single control variable, the effect of which is position independent, so that from a control view a stepper motor equipped with an electronic commutator system according to the invention looks like a standard DC motor.

Another object of the invention is to simplify stepper motor control to achieve control by a single control variable which is position independent, while still permitting anomaly correction via the single control variable.

Another object of the invention is to apply electronic commutation to stepping motors; to enable appropriate coils according to a control law, through a single control amplitude demand input.

An object of the invention is to make stepper motor control achievable with a single control input, independent of motor position (angle), and to obtain maximum force (torque) from the motor.

An object of the invention is to follow the commutation principle:

Given the present position and speed of the motor and a desired direction of motor's force, energize the coils which maximize the force in the desired direction. For many motors this rule achieves a nearly position independent force.

Another object of the invention is to achieve position independence, by energizing the enabled coils with an appropriate magnitude.

Another object of the invention is to make the commutation principle effective for all types of linear or rotary stepper motors, including linear variable reluctance stepper motors, coupled phase or uncoupled phase, or permanent magnet stepper motors, or hybrids, using the magnitude of current or voltage applied to the energized coils combined with the desired direction of the motor's force to form the control input, and using a control law to dictate the control input's value.

A feature of the invention is the use of a programmable logic array in an electronic commutator to provide coil enabling selection signals as a composite function of present position feedback signals, in a first feedback loop, control direction signals, signals and phase advance signals, using a microprocessor to calculate dynamic control amplitude signals and phase advance signals as a composite function of present position feedback signals, in a second or subsequent feedback loop, providing position signal control information, with dynamic position and anomaly correction forwarded as a current (voltage) control amplitude signal to the motor coils of the stepper motor, and a phase advance signals to the programmable logic array.

An advantage of the invention is that an available stepper motor, known for power and economy, may be operated as a precision positioner by the combination of position sensing and external electronics including a microprocessor, programmed logic array and electronic commutator.

Another advantage of the invention is that a stepper motor equipped according to the invention may be positioned in increments of fractional steps, and held in place indefinitely with very small use of power.

Another advantage of the invention is that a stepper motor may be operated according to complex dynamic control patterns corrected for present position, desired position, temperature and magnetic anomalies and other factors considered by a microprocessor, which control patterns may be easily reconfigured by programming.

The foregoing and other objects, features and advantages of the invention will be apparent from the more particular description of the preferred embodiments of the invention, as illustrated in the accompanying drawings.

DESCRIPTION OF A PREFERRED EMBODIMENT OF THE INVENTION

The preferred embodiment is an electromagnetic actuator system using a double closed-loop dynamic anomaly corrected computer selected electronic commutation technique for control of a linear or a rotary stepper motor, for the correct enabling of the motor coils based on position sensing of the motor phase, application of control law and anomaly correction, and selection of destination.

The electronic commutator for the stepper motor has the same function as brushes in a DC motor and is analogous to the commutator of a brushless DC motor. The computer provides motion-to-destination profiles, corrected for present position and for anomalies such as a square-law in variable reluctance stepper motors, as control amplitude signals to the motor coils selected by the electronic commutator.

In the electromagnetic actuator system of the invention, the stepper motor has the ability to function much like a D.C. servomotor. Commutation is the correct enabling of the motor coils determined by position sensing. Electronic commutation in the electromagnetic actuator system of the invention has the same function as brushes in a D.C. motor and is analogous to electronic commutation of a brushless D.C. motor. Using electronic commutation and a simple control law (e.g. PID control), one can achieve high positional accuracy, high speed, and force or torque control of linear or rotary stepping motors independent of the motor's cardinal step positions. These capabilities allow the use of stepper motors as efficient direct drive actuators for a robot.

This motor is composed of two parts, one moving relative to the other:

Coils—A motor includes two rigidly connected E-cores. On each E-core three coils are mounted, one on every leg.

Bar—The bar, situated between the two E-cores, has rectangular teeth of a fixed period or pitch on its surface.

Figure 1:
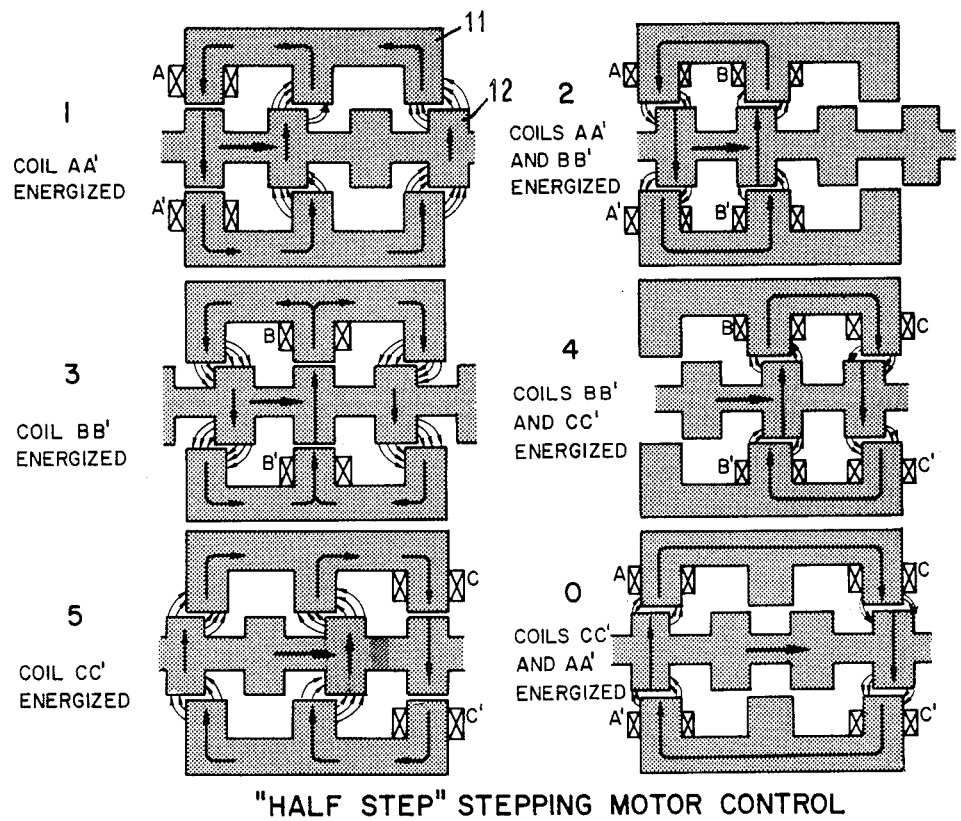
FIG. 1 is a composite position diagram of a stepper motor showing half-step control.

FIG. 1 illustrates a three phase V.R. linear stepper motor. The motor includes two rigidly connected E-cores 11 each having three legs on which coils are mounted. A bar 12 composed of rectangular teeth of a fixed period or pitch is situated between the two opposing E-cores. This particular bar has a tooth pitch of 2.54 mm (0.1 in.). FIG. 1 shows the result of sequencing the motor to move the bar to the right by half-steps. Six half steps are required to move the bar one tooth pitch. In half-stepping the bar to the right the coils are energized as shown in the figure by alternately energizing one and two coils. Motion to the left is achieved by reversing the sequence of coils energized. It is also possible to advance the motor by full-steps rather than half-steps by energizing only one coil at a time, but the greater variation in force makes this method less attractive. The six coarse positions of the motor in FIG. 1 are referred to as the commutation phase. The commutation phases and the desired direction of motion determine which coils are to be energized.

FIG. 1 also illustrates the complicated flux paths of this coupled phase motor. For example the magnetic flux from a single coil being energized passes through all three legs of the E-cores.

Sequencing through phases 1, 2, 3, 4, 5, to 0 and back to 1 would require the flux direction in coil AA' to change from up to down. Since such a change cannot happen instantaneously, it is better not to require the flux's orientation to reverse. By alternately stepping the motor through the 6 phases with the flux oriented as in FIG. 1 and then with the fluxes reversed, such abrupt changes in flux orientation are removed. The sequencing of this motor and many rotary motors is thus very complicated.

Figure 2:
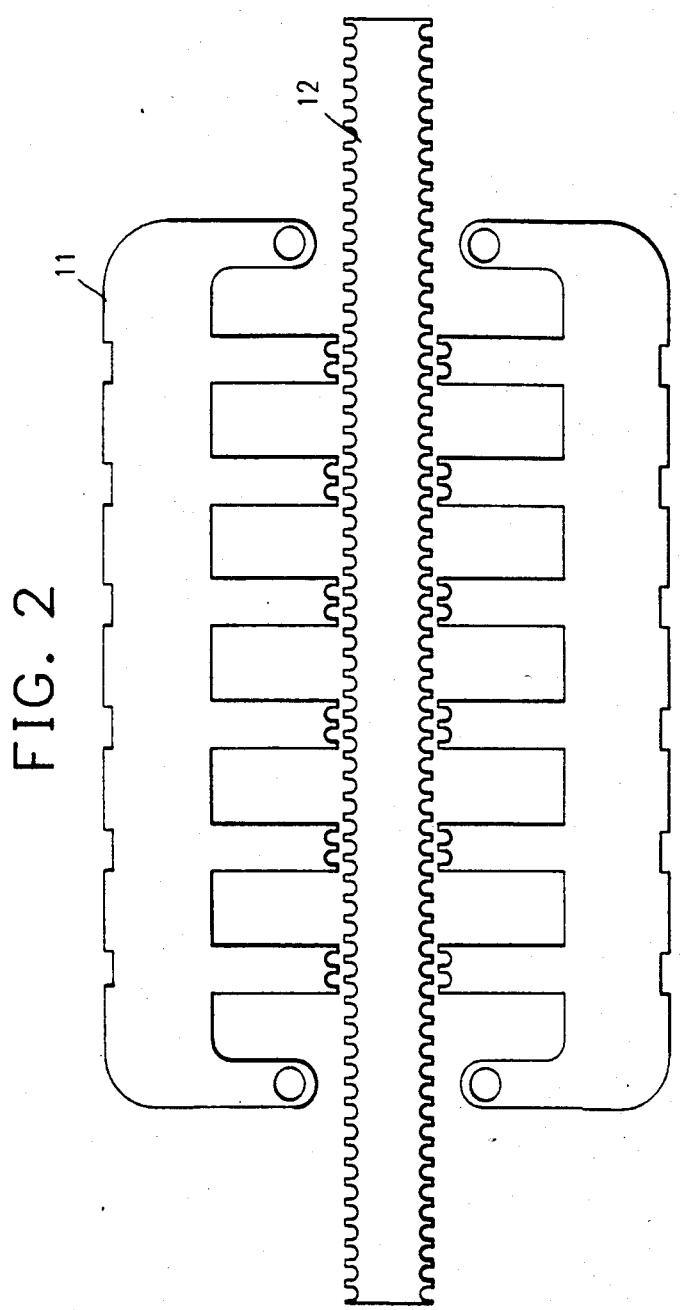
FIG. 2 is a diagram showing uncoupled phase 3-phase linear variable reluctance (VR) motor laminations, showing two E-cores and a segment of the bar.
Figure 3:
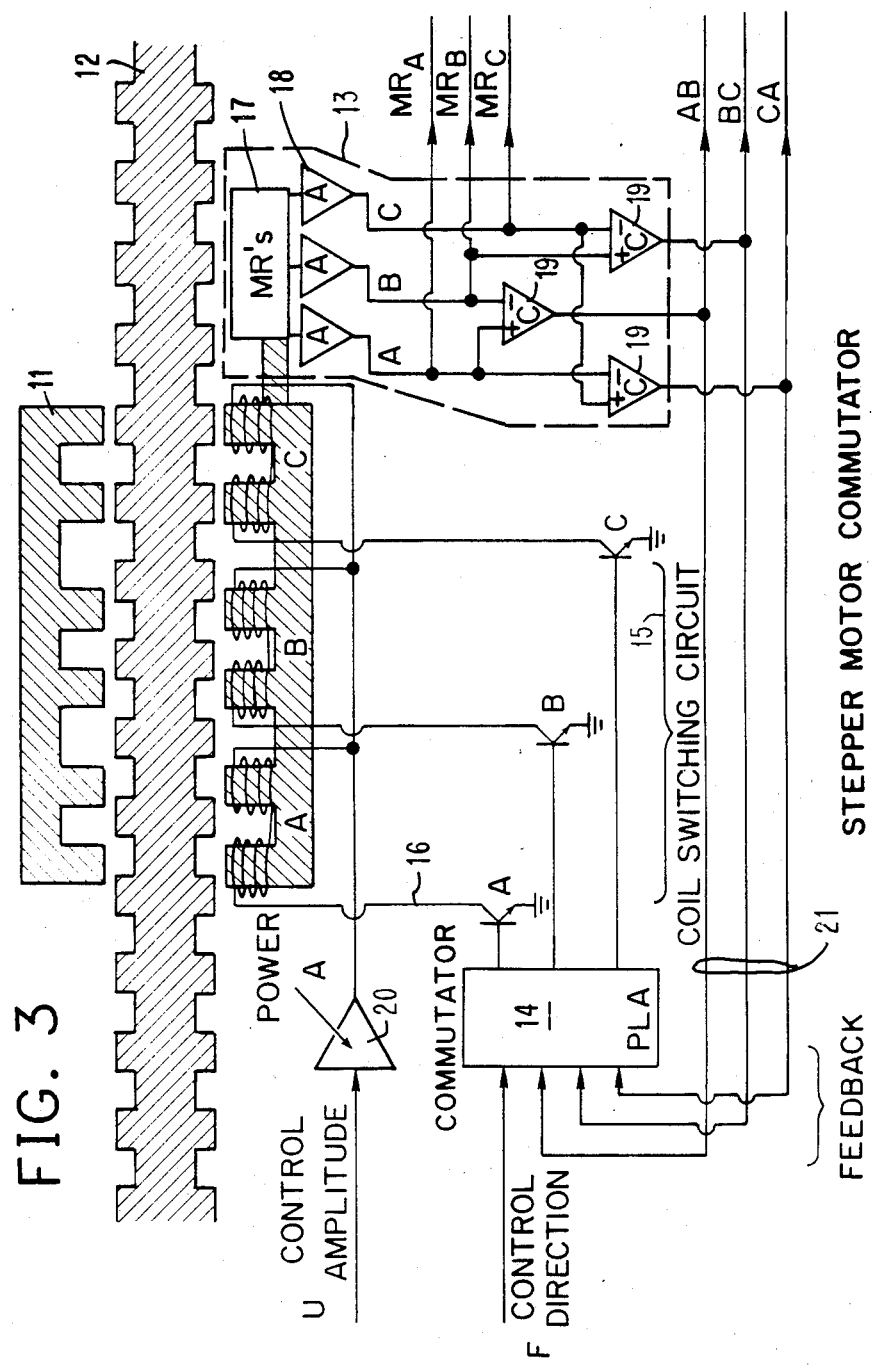
FIG. 3 is a diagram showing commutator parts for a 3-phase uncoupled phase stepper motor.

FIGS. 2 and 3 show an uncoupled motor, with simplified sequencing as in the experimental motor developed by Pawletko and Chai, Linear Stepping Motor with Uncoupled Phases, Proc. of Thirteenth Annual Symp. on Incremental Motion Control Systems and Devices, University of Illinois, May 1984, pp. 245-250 supra under "PUBLICATIONS." The basic principles of operation of variable reluctance motors is the same in the uncoupled motor, but the relative direction of the flux in each of the motor's coils is unimportant. In the following discussion it is simpler first to discuss the commutation of the uncoupled motor and then to show how a coupled motor can also be commutated. Stepper motor 11-12 has position sensor 13, which feeds back position information to Programmable Logic Array (PLA) 14, which provides control signals to A-B-C commutation switches 15. Switches 15 complete circuits for enabling currents to respectively connected coils 16, to accomplish stepper motor operation. The position sensor 13 is made up of magnetic resistors (MRs) 17, arranged to face the teeth of bar 12 in a known relationship for proximity sensing. The MRs 17 provide outputs via amplifiers 18 to comparators 19, which thus provide binary signals for feedback.

Power amplifier 20 receives control amplitude stepper motor demand signals and provides power control accordingly to the motor coils.

Feedback connectors provide a feedback path 21 to return position data to PLA 14.

Commutation Phase Sensing

As in a brushless D.C. motor commutator, a stepper motor commutator includes three parts: a position sensor, commutator logic, and electronic coil switches. The position sensor must provide enough information to detect which phase, 0, 1, ..., or 5, the motor is in.

Figure 4:
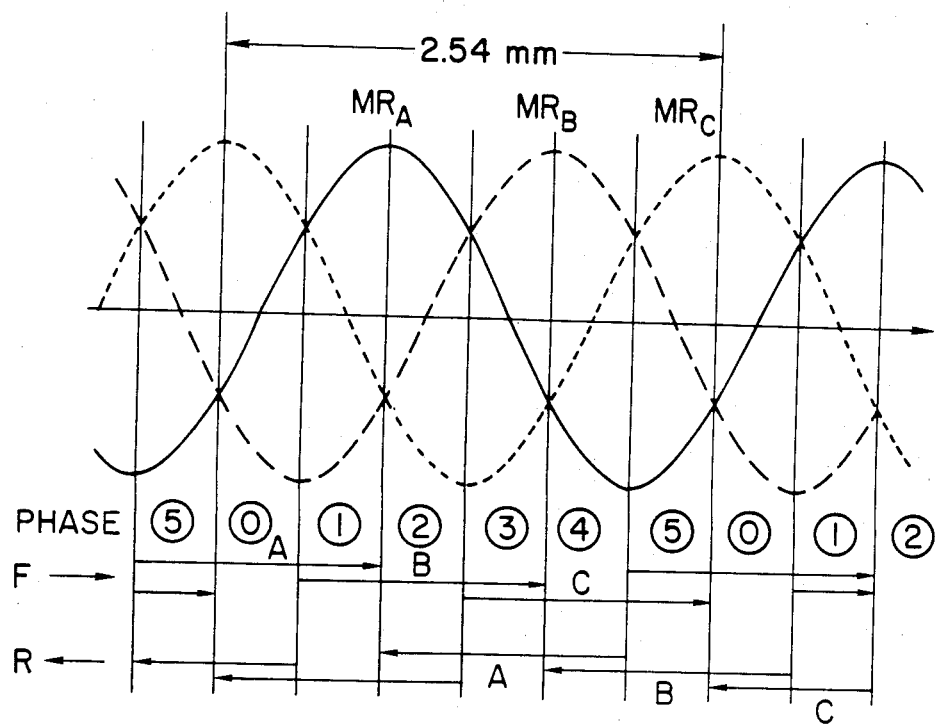
FIG. 4 is a phase diagram showing the principle of commutation of a 3-phase stepper motor.

FIG. 4 illustrates how three magnetic resistor (MR) sensors can efficiently provide the necessary signals. The MRs are mounted on an E-core and sense the changing permeance as the bar moves under them. FIG. 4 shows three MR output voltages each of a period of one tooth pitch, 2.54 mm (0.1 in). Because each MR is physically mounted one third of a tooth pitch from its neighbor, the signals are 120 degrees apart in phase. Comparators, (C) in FIG. 3, on the outputs of the MRs produce three binary signals AB, BC, and CA. The three digit binary word AB,BC,CA represents a Gray code of the commutation phase in correspondence with one of the positions the motor might be in as in FIG. 1. Completely independent from deriving the phase information to control commutation. The MR voltages can be measured by an A/D converter and processed to determine the motor's position.

FIG. 4 also shows the choice of coils to be enabled as a function of the six discrete phases and the desired force direction, Forward or Reverse.

Figure 5:
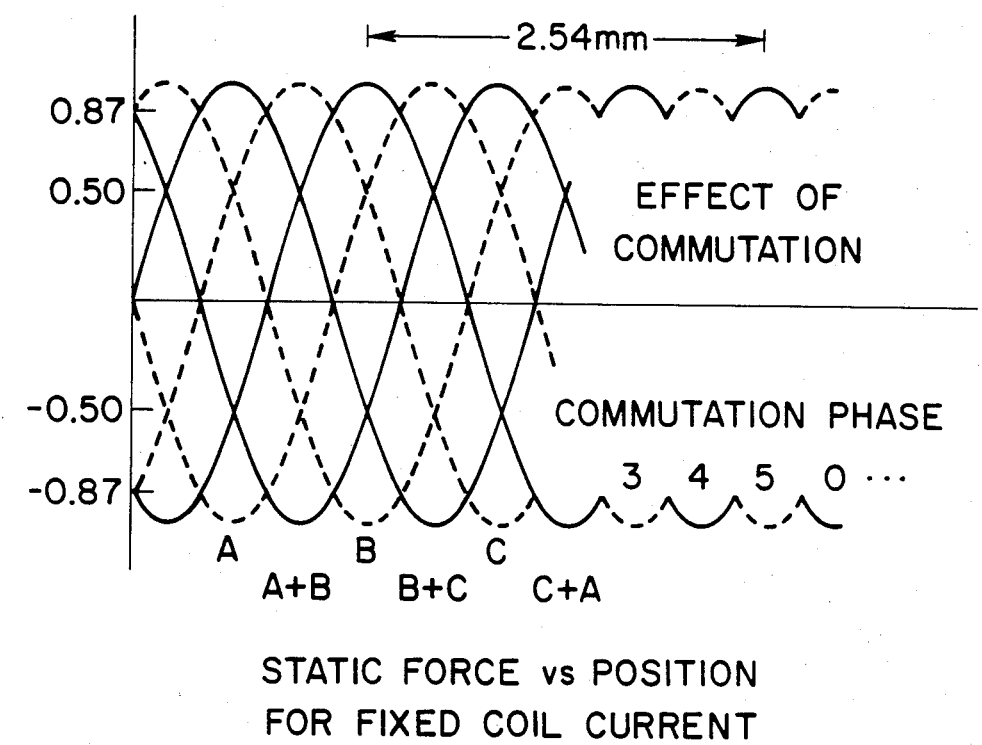
FIG. 5 is a phase diagram showing static force ripple of a 3-phase stepper motor.

FIG. 5 illustrates the force each coil and pair of coils can produce as a function of position with fixed coil current and the result of commutation. For an approximation of perfectly sinusoidal forces as a function of position—the true forces are not so perfect—commutation provides a nearly constant torque. The variation is only 13%.

The commutation logic for the 3-phase uncoupled stepper motor is represented by the following three logical equations, $$A = F\overline{BC} + \overline{F}BC$$

$$B = F\overline{CA} + \overline{F}CA$$

$$C = F\overline{AB} + \overline{F}AB \qquad (1)$$

where A, B, and C are logical variables that represent respectively if coil A or B or C is on. AB, BC, and CA represent logical values of the comparison between the outputs of the corresponding MRs and so provide the commutation phase in a Gray code.

For a coupled motor the commutation logic is somewhat more complex, as a result of the coupling between the motor's phases which requires the motor to go through twelve half-steps to return to the same orientation of magnetic flux.

The sequence of coils enabled follows the typical open-loop sequence of half-steps with an average phase lead of 1.5 phases (between 1 and 2 phases) in the direction of the motion. The main difference between electronic commutation and usual half-stepping is that the coil sequencing is generated automatically by closed-loop feedback from the motor phase sensor (the MRs in our example). In fact the commutator logic functions as a very fast closed-loop feedback system around the motor (at 1.5 m/sec, 3600 coil switches/sec at the right time are necessary). In FIG. 3 the coil switching circuits are represented by "symbolic" transistors A, B, C. The actual circuits can be quite complex depending on the maximum voltage used and switching times required.

The practical limitation resulting from the switching circuits is a limit on the minimum time it takes the current through a coil to be switched on or off. This limit is imposed by the coil inductance, L, and the maximum voltage, $V_{max}$, the switching circuit can handle through the equation $|di/dt|_{max} = V_{max}/L$.

The delay in the build up of current and force effectively causes the correct commutation to be delayed. This problem may be partially overcome by advancing the measured motor phase and thus advancing the commutation. The results are the same as in excitation advance for conventional stepper motor control; the motor develops higher torque at high speeds.

The following is the required logic to achieve phase advance where $V_s$ is the sign (direction) of the required phase advance and $V_1$, $V_0$ is the binary magnitude in units of half-steps:

$$\widetilde{AB} = V_s V_0 \overline{V_1} \overline{BC} + V_s \overline{V_0} V_1 CA + \qquad (2)$$

$$V_0 V_1 \overline{AB} + \overline{V_s} V_0 \overline{V_1} \overline{CA} + \overline{V_s} \overline{V_0} V_1 BC + \overline{V_0} \overline{V_1} AB$$

$$\widetilde{BC} = V_s V_0 \overline{V_1} \overline{CA} + V_s \overline{V_0} V_1 AB +$$

$$V_0 V_1 \overline{BC} + \overline{V_s} V_0 \overline{V_1} \overline{AB} + \overline{V_s} \overline{V_0} V_1 CA + \overline{V_0} \overline{V_1} BC$$

$$\widetilde{CA} = V_s V_0 \overline{V_1} \overline{AB} + V_s \overline{V_0} V_1 BC +$$

$$V_0 V_1 \overline{CA} + \overline{V_s} V_0 \overline{V_1} \overline{BC} + \overline{V_s} \overline{V_0} V_1 AB + \overline{V_0} \overline{V_1} CA$$

The new binary word $\widetilde{AB}, \widetilde{BC}, \widetilde{CA}$ represents the position phase measurement advanced in the direction of $V_s$ an amount determined by the magnitude $V_1$, $V_0$. To arrive at the correct commutation including advance, $\widetilde{AB}, \widetilde{BC}, \widetilde{CA}$ replaces AB,BC,CA in the commutator logic (1).

CONTROL OF A COMMUTATED STEP MOTOR

A digital controller for an electronically commutated stepper motor need only provide definition how much voltage (or current) is to be applied to the motor at an instant and the direction in which the force is to be generated by the motor. In an ordinary D.C. servomotor system the same is provided by the magnitude and sign of the driving voltage to the D.C. motor.

Both coupled and uncoupled phase variable reluctance stepper motors have been driven with a digital PID (proportional, integral, derivative) control law. While this represents a simple servo control strategy, its use in controlling a stepping motor is new.

A Motorola 68000 with the digital and analog ports found on an RRA card (See Description of the Prior Art, under The RRA card.) was a convenient host for experiments, although numerous commercially available microprocessor systems would do. The processor is relegated the task of interpreting motor position, estimating motor velocity, and synthesizing the control signal (FIG. 6).

Figure 6:
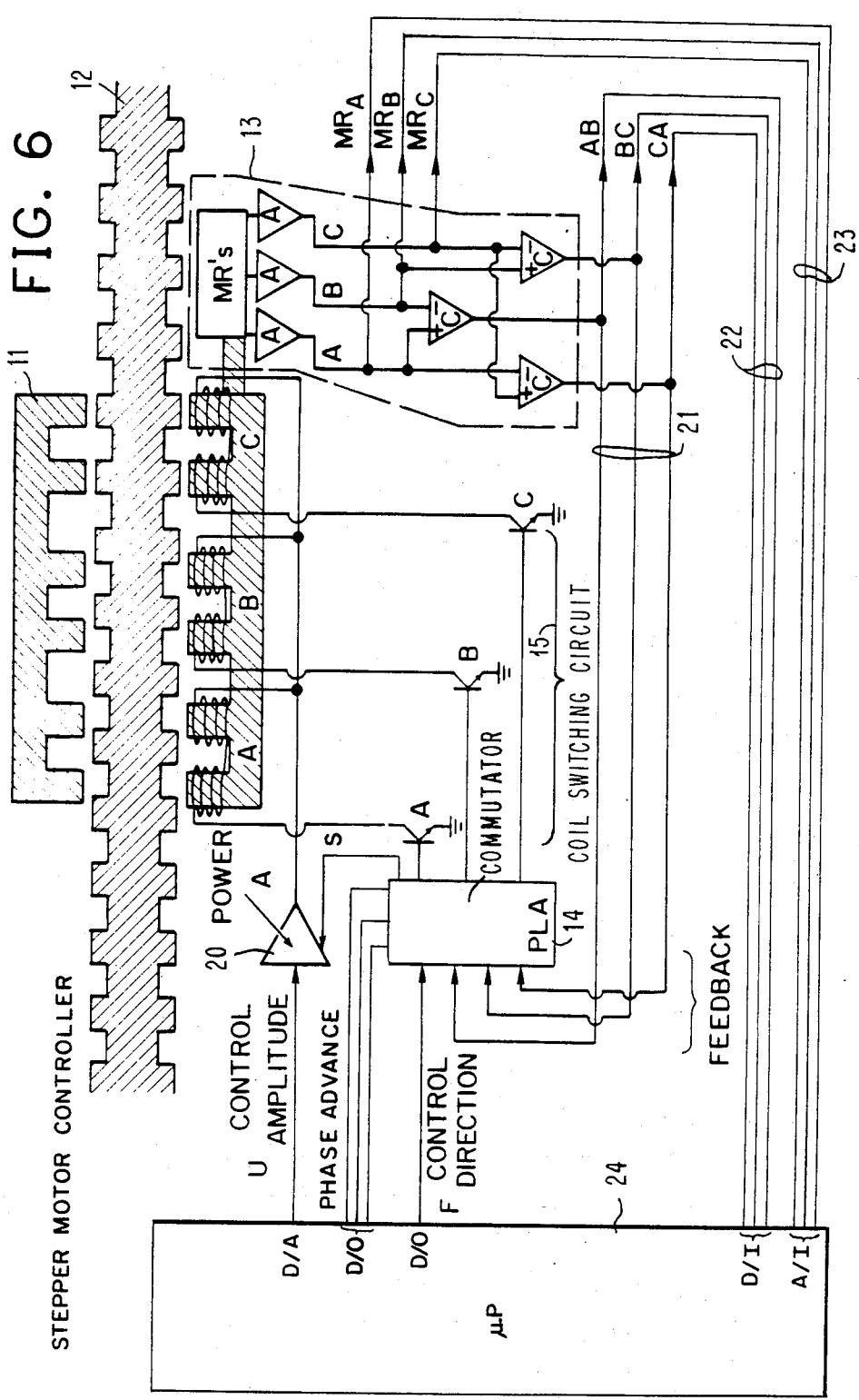
FIG. 6 is a schematic diagram of a microprocessor controller of an electronically commutated stepper motor according to the invention.

FIG. 6 is similar to FIG. 3 but with the addition of digital coarse position feedback loop 22 analog and fine position feedback loop 23, which provide position data to microprocessor 24.

Motor position can be derived from the MR signals or from a distinct encoder. Velocity could be measured from a tachometer, but the added expense and complexity, especially in the linear actuator case, was not justified for our application. The processor could provide an adequate estimate of velocity.

A Simple PID Controller

The first step in computing the control term is to form the difference between the desired position, $x_d$, and the actual position of the motor at time k, $x_k$. Given the velocity of the motor at time k as $v_k$, a discrete PD control law is then $$U_k = -K_e(x_k - x_d) - K_v v_k \quad (3)$$

where $K_e$ and $K_v$ are gains on positional error and velocity, respectively, and $U_k$ is the control.

As no tachometer is present, an estimate, $\hat{v}_k$, must be used for $v_k$. The simplest estimate is to use the first backward difference, a numerical derivative, of the past position measurements, $$\hat{v}_k = x_k - x_{k-1}. \quad (4)$$

As this is known to be a rather "noisy" estimator, other simple schemes are employed. For example, by fitting 2'nd or 3'rd order polynomials to the data $x_k$, $x_{k-1}$, $x_{k-2}$, . . . and then evaluating the derivative of the polynomial at time k, the error in such an estimate can be proven smaller for sufficiently high sample rates. These estimates did in fact improve the performance of the PID servo run at various sample rates between 0.5 and 2 kHz.

With $U_k = -K_e(x_k - x_d) - K_v \hat{v}_k$, the sign of $U_k$ determines the direction the motor is to accelerate and the magnitude determines the magnitude of voltage. Hence the sign of $U_k$ is output to the commutator for the signal F, the magnitude of $U_k$ is output to the power amplifier to drive the motor, and the value of $\hat{v}_k$ is quantized and provided to the commutator for control of the phase advance (FIG. 6). Lastly, to accommodate a zero steady state error criterion, a linear control designer adds an integral term—a sum in the discrete case—to the control, forming the PID control:

$$U_k = -K_e(x_k - x_d) - K_v \hat{v}_k \quad (5)$$
$$-K_i \sum_{j=n}^{k} (x_j - x_d)$$

where n<k is chosen to be some finite vaue. If this control law is asymptotically stable, the value of position $x_k$ as k tends to infinity is $x_d$ exactly.

This simple control provides enormous flexibility. The gains may be adjusted to specify the transient response of the motor depending on load and desired trajectory. The entire motor system is easily incorporated into robot applications where motions may be specified by a robot programming language like AML.

Compensation for Non-Linearity

V.R. motors, unlike D.C. servo motors, have a pronounced non-linearity. At current levels well below flux saturating values, the static force developed is proportional to the square of the coil current. As we are trying to "servo" the motor to a desired position with a linear control law, we might expect this non-linearity to adversely affect the performance. The obvious compensation for the non-linearity is not to drive the motor with $U_k$ but rather with $$u_k = \text{sign}(U_k)\sqrt{|U_k|}. \quad (6)$$

This compensation is correct when current is used as the control. In fact, far higher stiffness—larger values of $K_e$—with good transient response could be achieved with the square root than without it even when voltage was applied as the control. For better performance $u_k$ replaces $U_k$ as the control signal driving the motor—commutator system.

Performance

The good performance of this control scheme coupled with the commutator makes the approach very attractive. For large moves, a PD controller has driven the uncoupled phase motor at speeds over 1.4 m/sec (55 inch/sec) on a 0.5 m (18 inch) bar, and yet stopped it in a critically damped manner. In another application a PID controller provides zero error on a 0.002 mm (0.00008 inch) resolution encoder with a good transient response.

Figure 7:
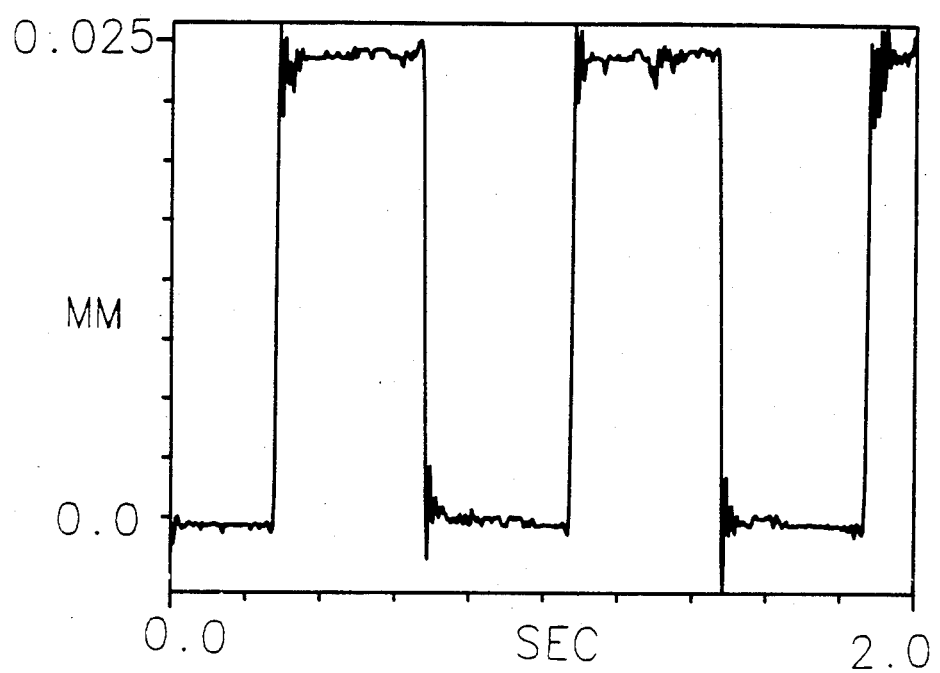
FIG. 7 is a position/time diagram of small step response using a PD controller.

FIG. 7 shows the transient response while commanding the coupled phase linear motor to move in 0.025 mm steps (0.001 inch). The apparent stiffness of this PD controller (the force required to displace the motor from various commanded equilibrium positions) was measured at 90 Nt/mm (450 lb/in). This stiffness is comparable with that of micro-stepping methods.

Figure 8:
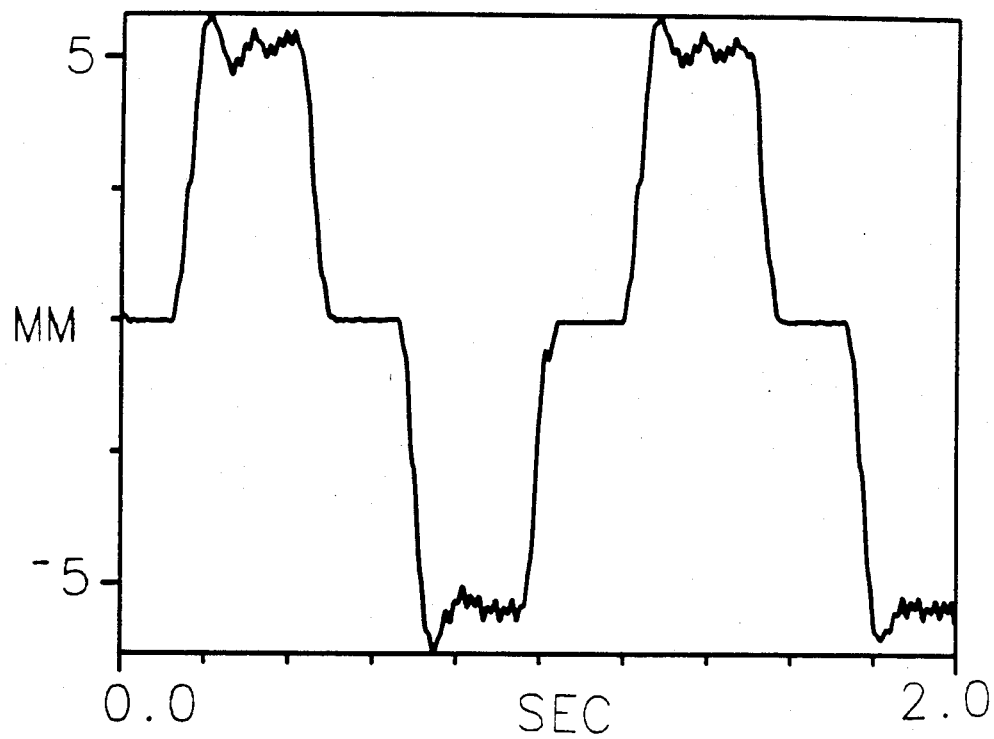
FIG. 8 is a position/time diagram of large step response using a PD controller with two sets of gains.

FIG. 8 shows the result of commanding a 300 mm (6 inch) move under direction of AML at a speed of 0.5 m/sec (20 inch/sec) and acceleration/deceleration of 10 m/sec (1 g). The error between the position goal, $x_d$, and the actual position at each instant hardly exceeds 5 mm (0.2 inch). To achieve this performance the gains $K_v$ and $K_e$ switched between two values depending on the position error and the velocity. FIG. 1 shows the results of sequencing the motor to move the bar to the right by Half-Steps—it is convenient here to refer to the coils as fixed and the bar in motion. It is necessary to go through the six half-steps shown to move the bar one tooth pitch as indicated by the motion of the horizontal arrow in FIG. 1. Thus every half-step moves the bar one sixth of a tooth pitch (e.g. about 0.43 mm).

In half-stepping the bar to the right, alternating between one and two coils energized, the sequence of phases (half-steps) 1, 2, 3, 4, 5 and 0 is repeated. Motion to the left is achieved by reversing the sequence of phases. It is also possible to advance the motor by full-steps rather than half-steps by the sequence of phases 1, 3 and 5 repeated, with only one coil energized at a time. This method is inferior because of larger steps, lower maximum force, and the larger force variation during the stepping of the motor.

The best positional resolution is one half-step (e.g. about 0.43 mm) which is achieved by using the half-step method. Using the full-step method only a full-step resolution can be achieved.

If the motor is sequenced through phases 1, 2, 3, 4, 5 to 0 and back to 1 then the flux direction in coil AA' changes from up to down. Such a change in flux direction cannot be done in zero time (with a finite voltage), and thus it is more desirable not to require the change in flux direction at this transition. This can be achieved by a "double cycle," alternating between two cycles of half-steps where the first is with flux directions shown in FIG. 1 while the second is with all fluxes in the opposite direction. This complicates the sequencing of such a magnetically coupled stepper motor.

An uncoupled motor developed by Pawletko and Chai has simplified sequencing. The basic principle of operation of a variable reluctance uncoupled motor is the same as a coupled motor, but in an uncoupled motor the relative direction of the flux in each of the motor coils is unimportant. Thus the "double-cycle" sequencing method in a coupled motor is not required in an uncoupled motor.

The simplicity of sequencing an uncoupled motor is also reflected in a particularly simple electronic commutator for an uncoupled motor. This is expected for when the motor is moving in one direction the commutator reproduces (by closed-loop feedback) the standard open-loop half-step motor sequencing. How such a closed-loop commutator works is explained in the next Section.

ELECTRONIC COMMUTATOR OPERATION

Similar to a brushless DC motor commutator, a stepper motor electronic commutator includes the following three parts:
1. Position sensor.
2. Commutator logic.
3. Electronic coil switches.

Comparing this part list with a standard stepper motor controller, we see the addition of a position sensor. The rest of the parts are equivalent since the commutator logic corresponds roughly in complexity to the standard sequencing logic. Let us describe the details of these three parts.

For a 3-phase uncoupled stepper motor FIG. 4 shows how one can deduce which of the six-phases (1, . . . ,5,0) the motor is in by using three Magnetic Resistor (MR) sensors. The MR's are mounted on the end of an E-core and sense the bar's reluctance which changes as the MR's move along the bar's teeth.

FIG. 4 shows an ideal Magnetic Resistor (MR) output as a voltage which is a sine function of the relative coil-bar position with a period of the tooth pitch of the bar (e.g. 2.54 mm). Magnetic resistors (magnotostrictive resistors) are marketed by Siemens; resistance change as a result of magnetic flux and biasing makes the MR a convenient and effective proximity transducer for a toothed ferromagnetic bar. The three MR sensors are physically mounted to be one third of the bar tooth pitch apart. This results in three MR voltage that are 120 degrees apart (FIG. 4). Using the outputs of three Comparators (C) which compare the outputs of each pair of MR's, we obtain three logic variables, AB, BC, and CA, which represents a Gray code of the phase (half-step) the motor is in.

In practice an MR output is a skewed sine function. Nevertheless the exact six motor phases can be obtained by properly adjusting each of the MR's gain and offset (4 adjustments) and the MR's skew relative to the bar. A second simpler method is to use the zero crossings to determine the motor phase (only 3 adjustments). The above adjustments are not very critical, but can be avoided by use of matched MR's. In our experience, with MR's that were not well matched, only a single initial adjustment was necessary.

It is necessary to do an initial alignment of the MR's sensed motor phase to the actual motor's phase.

In the overall system (FIG. 6) the MR's are used for two measurements:
Motor Phase—coils relative to the bar.
Motor Position—coils relative to a given point (absolute position).

The MR sensor physically measures the magnetic position of the coils relative to the bar. It is an ideal sensor to measure the motor phase, but this sensor can have a noticeable error when interpreting it as the motor "absolute" position. We consider three types of errors:
1. Fixed errors which affect the absolute position interpretation of the measurement.
2. Variable errors which affect the repeatability of positioning.
3. Sensor noise which limits the positioning resolution.

The fixed error is because of the accuracy of the bar teeth spacing and in the preferred embodiment is less than 1 mm. This error can be corrected by calibration and use of a lookup table. The variable error is because of the heat expansion of the bar and cannot be calibrated out easily but in the preferred embodiment i limited to 0.1 mm in worst case and typically is less then 0.01 mm. The sensor noise at a bandwidth of a few kHz limits the position resolution to about 0.0008 mm which gives a dynamic range of 500000 (19 bit) on the 0.5 m bar.

When using the MR's to obtain "absolute" motor position, one uses the MR's phase transition counting as the coarse part of the position detection (10 bits in the preferred embodiment) and an A/D (Analog to Digital) conversion of the appropriate MR output to obtain finer position resolution (additional 9 bits). The following logic selects the appropriate MR analog output to be read by the A/D converter:

$$MR0 = AB\ \overline{BC} + \overline{AB}\ BC$$

$$MR1 = AB\ \overline{CA} + \overline{AB}\ CA \tag{7}$$

where the code MR1,MR0 is interpreted:
$01 = MR_A$, $10 = MR_B$ and $11 = MR_C$.

In the preferred embodiment the sampling rate (2 kHz) is not high enough to ensure that the microprocessor did not lose any MR transitions (coarse position). To overcome this problem the MR's phase measurement (AB, BC, CA) is used to update the estimated phase derived from the previously measured motor velocity Control Programs section, infra, under subhead "Derivative of polynomial for velocity estimate" and position. Thus even with more than two phase changes (half-steps) between samples, the coarse position "count" was not lost.

Commutator Logic

FIG. 4 shows the choice of coils to be enabled as a function of six discrete phases (half-steps) and the desired force direction, Forward or Reverse. This choice follows the commutation principle given before and has quite low force ripple (about 13%) as a function of motor position (FIG. 5).

The most important property of this commutation function is that the motor will still apply force in the correct direction even with an error of up to plus or minus one incremental phase (one full half-step). This last property is essential for practical operation of a stepper motor commutator due the inevitable error in the motor phase sensing.

The commutation logic for a 3-phase uncoupled stepper motor is represented by the following three logical equations:

$$A = F\,\overline{BC} + \overline{F}\,BC$$

$$B = F\,\overline{CA} + \overline{F}\,CA$$

$$C = F\,\overline{AB} + \overline{F}\,AB \qquad (8)$$

where A, B, and C are logical variables that represent respectively if coil A or B or C is on, and AB, BC, and CA represent logical values of the comparison between the outputs of the corresponding MR's, i.e. the motor phase in Gray code.

For a coupled motor the commutation logic is somewhat more complex and is given in the Control Programs section under subhead Commutation logic for a coupled motor." The added complexity is a result of the coupling between the motor phases which requires the motor to go through twelve half-steps to return to the same orientation of magnetic flux.

The sequence of coils enabled follows the standard open-loop sequence of half-steps with an average phase advance in the direction of motion of 1.5 "phases" (between 1 and 2 "phases"). The main difference between our electronic commutation and "standard half-stepping" is that the coil sequencing is generated by closed-loop feedback from the motor phase sensor (MR's in the preferred embodiment) and thus never loses synchrony. In fact the commutator logic functions as a very fast—at 1.5 m/sec, 3600 coil switching/sec at the right time are necessary—closed-loop feedback system around the stepper motor. This is the key to the simultaneous achievement of high speed and insensitivity to varying motor load which is almost impossible to achieve with standard sequencing approaches.

The following logic variable S is true if only one coil is energized $$S = F(\overline{AB}\,\overline{BC} + \overline{BC}\,\overline{CA} + \overline{CA}\,\overline{AB}) + \overline{F}(AB\,BC + BC\,CA + CA\,AB) \qquad (9)$$

In FIG. 5 we assumed that the above logic was used to modulate the power amplifier gain (FIG. 6) so that the actual force variation (up to 40%) in energizing one or two coils was compensated for using the logic in (9).

Phase Advance

In FIG. 3 the coil switching circuits are represented by "symbolic" transistors A, B, C. In this paper it suffices to say that these circuits can be quite complex depending on the maximum voltage used and switching times required. Usually "a half-bridge circuit" is a good choice for an uncoupled VR step motor.

The practical limitation resulting from the switching circuits is a limit on the minimum time it takes the current through a coil to be switched on or off. This limit is because of the coil inductance, L, and the maximum voltage, $V_{max}$, the switching circuit can handle through the equation $|di/dt| = V_{max}/L$.

Because of this effect, the correct enabling of the coils by the commutator is effectively delayed as the motor speed increases. When the motor moves very fast compared to the required switching time of the coils' current, the commutator feeds the motor with a triangular waveform rather then a square waveform. At this point and beyond, the effective delay in switching the coils' current is maximum and equal to 1.5 phases (half-steps).

One can fix this delay problem by appropriately advancing the measured motor phase by using an estimate of the motor velocity. But beyond the above maximum delay point, more than 1.5 phases advance is not helpful and the motor force drops monotonically as speed increases (the maximum current reached in the coils drops).

The following is the required logic to achieve the above phase advance where $V_s$ is the sign (direction) of the required phase advance and $V_1$, $V_0$ is the binary magnitude in units of half-steps.

$$\widetilde{AB} = V_s V_0 \overline{V_1}\,\overline{BC} + V_s \overline{V_0} V_1 CA + \qquad (10)$$

$$V_0 V_1 \overline{AB} + \overline{V_s} V_0 \overline{V_1}\,\overline{CA} + \overline{V_s}\,\overline{V_0} V_1 BC + \overline{V_0}\,\overline{V_1} AB$$

$$\widetilde{BC} = V_s V_0 \overline{V_1}\,\overline{CA} + V_s \overline{V_0} V_1 AB +$$

$$V_0 V_1 \overline{BC} + \overline{V_s} V_0 \overline{V_1}\,\overline{AB} + \overline{V_s}\,\overline{V_0} V_1 CA + \overline{V_0}\,\overline{V_1} BC$$

$$\widetilde{CA} = V_s V_0 \overline{V_1}\,\overline{AB} + V_s \overline{V_0} V_1 BC +$$

$$V_0 V_1 \overline{CA} + \overline{V_s} V_0 \overline{V_1}\,\overline{BC} + \overline{V_s}\,\overline{V_0} V_1 AB + \overline{V_0}\,\overline{V_1} CA$$

The function of the phase advance logic is just to do addition of the signed ($V_s$) magnitude ($V_1$, $V_0$) input and the measured phase ($\widetilde{AB}$, $\widetilde{BC}$, $\widetilde{CA}$ in Gray code) to obtain the required "advanced-phase" AB, BC, CA, also in Gray code. In fact a standard binary adder could be used (with appropriate wraparound logic) for phase-advance if the Gray code were converted to binary. This observation is especially important when using more than six phases where the Gray code adder becomes much more complex.

In fact in the preferred embodiment we could get somewhat better performance if we split every phase into two (use quarter steps rather than half-steps) so we could achieve less ripple in the force as the motor speed increases and attain the ideal maximum phase-advance of 3 quarter steps (1.5 half-steps).

To reduce the chip count a Programmed Logic Array (PLA) is used to implement the required logic. For the uncoupled motor one 83S153 PLA was sufficient to contain the commutation logic (8), the one-two coil logic (9) and the phase advance logic (10). For the coupled motor the same PLA was used for phase advance and one-two coil logic, and a second PLA was required for commutation because of the large number of input/output connections needed and the additional complexity.

Note that one can use the phase-advance logic with a simple algorithm to adjust electronically the measured phase of the motor to the actual motor phase, i.e. the relative relationship between the coil and the bar.

CONTROL OF A COMMUTATED STEP MOTOR

Digital Proportional-Integral-Derivative Control (PID)

A digital controller for an electronically commutated stepper motor need only define how much voltage (or current) is to be applied to the motor at an instant and the direction in which the force is to be generated by the motor. In an ordinary DC servo, the same signals are provided by the magnitude and sign of the driving voltage to the DC motor.

Two linear variable reluctance (VR) motors, a coupled phase and an uncoupled phase, have been driven with a PID control law, implemented on a Motorola 68000 micro-processor and associated D/A's and A/D's (FIG. 6). While this represents the simplest servo strategy, its implementation for driving a stepping motor is rather novel, and its good performance will become apparent. Also, the control method is not limited to either linear stepping motors or VR stepping motors.

A Motorola 68000 and associated digital and analog ports found on an RRA card (See Description of the Prior Art, under The RRA card.) was a convenient host for experiments, although numerous commercially available microprocessor systems would do. The processor is relegated the task of interpreting motor position, estimating motor velocity, and synthesizing the control signal. Motor position can be derived from the MR signals or from a distinct encoder. Velocity could also be measured from a tachometer, but the added expense and complexity, especially in the linear case, was not justified in the preferred embodiment. The microprocessor can provide an adequate estimate of velocity.

A Simple PD Controller

The first step in computing the control term is to form the difference between the desired position, $x_d$, and the actual position of the motor at time k, $x_k$. Given the velocity of the motor at time k as $v_k$, a discrete PD control law is then $$U_k = -K_e(x_k-x_d) - K_v v_k \tag{11}$$

where $K_e$ and $K_v$ are gains on positional error and velocity, respectively, and $U_k$ is the control.

As no tachometer is present, an estimate, $\hat{v}_k$, must be made for $v_k$. An easy estimate to form is found by taking a numerical derivative on past position measurements to form an estimate proportional to speed. The simplest is the first backward difference on position, $$\hat{v}_k = x_k - x_{k-1}. \tag{12}$$

As this is known to be a rather "noisy" estimator, other simple schemes are employed. For example, by fitting 2'nd or 3'rd order polynomials to the data $x_k$, $x_{k-1}$, $x_{k-2}$, ... and then evaluating the derivative of the polynomial at time k, the error in such an estimate can be proven smaller for sufficiently high sample rates.

These estimates did in fact improve the performance of the PID servo, run at various sample rates between 0.5 and 2 kHz.

With $U_k = -K_e(x_k-x_d) - K_v\hat{v}_k$, the sign of $U_k$ determines the direction the motor is to accelerate and the magnitude determines the magnitude of voltage. Hence the sign of $U_k$ is output to the commutator for the signal F, the magnitude of $U_k$ is output to the power amplifier to drive the motor, and the value of $\hat{v}_k$ is quantized and provided to the commutator for control of the phase advance (FIG. 6).

Compensation for Non-Linearity

VR motors, unlike DC servo motors, have a severe non-linearity, especially at low current levels, below saturation. This non-linearity is that the static force varies directly with the square of the coil current. As we are trying to "servo" the motor to a point with a linear control law, we might expect this non-linearity to adversely affect the performance. The obvious compensation for the non-linearity is not to feed the motor $U_k$ but rather $$u_k = \text{sign}(U_k)\sqrt{|U_k|}. \tag{13}$$

This compensation is correct when current is used as the control variable.

In fact, far higher stiffness—larger values of $K_e$—with good transient response could be achieved with the square root than without it. See Control Programs section, infra, under subhead "Square root computation."

Integral Term and a PID Controller

Lastly, to accommodate a zero steady state error criterion, a linear control designer adds an integral term—a sum in the discrete case—to the control, forming the PID control:

$$U_k = -K_e(x_k - x_d) - K_v\hat{v}_k \tag{14}$$
$$-K_i \sum_{i=n}^{k} (x_i - x_d)$$

where n<k is typically chosen to be some finite value possibly dependant on $x_k-x_d$, and $\hat{v}_k$. If this control law is asymptotically stable, the value of position $x_k$ as k tends to infinity is $x_d$ exactly.

Unfortunately, an integral controller can suffer from long settling times because of "wind up" of the integral. One scenario is that the integral builds up to overcome a positional error caused by friction. The integral term can not decrease until the sign of the position error has changed. Hence, the integral can induce large overshoots.

To combat this phenomenon the following anti-windup term for small moves is included, which achieves a much faster settling time.

$$U_k = -K_e(x_k - x_d) - K_v\hat{v}_k - K_i \sum_{i=n}^{k} (x_i - x_d) - K_w(x_k - x_n) \tag{15}$$

The effect of the term $K_w(x_k-x_n)$ is to reduce the effect of the integral term, once the motor starts moving.

The control law used for the VR step motor then is (13) where $U_k$ is computed by (15).

Variable Gains

One can meet difficulties in positioning precisely to 0.01 mm or less on a bar 0.5 m long. Even if the dynamics of the motor where perfectly linear, some other nonlinearities are present. One is that the power amplifier can only deliver a limited amount of voltage. To guarantee fast response and to overcome friction to attain high positional accuracies requires large feedback gains, $K_e$ and $K_v$. Such values are fine for small moves, but when a large move is required, say 0.3 m, these large values of gain immediately saturate the power drive at its maximum output. This effectively drives the motor open loop for much of the move, and can induce large overshoots. Secondly, as a robot programming language like AML (See Description of the Prior Art, under R. H. Taylor et al, AML.) produces sequences of set points (sequences of $x_d$'s) for the actuator to follow, the requirement that the actuator (in this case, the linear motor) attain each set point is not really the desired performance. A sequence of evenly spaced points is really meant to drive the actuator at a constant speed, not to jerk it from point to point as quickly as possible. Thirdly, high gains reduce the margin of stability of the controller. Large moves with large gains produce large forces which can induce structural vibrations and result in instability.

All three of these problems can be addressed simply by varying the gains $K_e$ and $K_v$. When the value of $A|x_k-x_d|$ or when the value of $\hat{v}_k$ is large, the value of the gains is reduced. This simple strategy alleviates the difficulties of high gains and assures high positional accuracy and fast response. This type of control, so easily implemented digitally, is quite cumbersome to effect in an analog controller.

Performance

The starting good performance of these rather naive control schemes coupled with the commutator is what makes this entire approach so attractive. For large moves, a PD controller has driven the the uncoupled phase motor at speeds over 1.4 m/sec (55 inch/sec) on a 0.5 m (18 inch) bar, and yet stopped it in a critically damped manner.

More important is the positional accuracy and stiffness that can be achieved with this control method. FIG. 7 shows the result of commanding the coupled phase linear motor to move in 0.025 mm steps (0.001 inch). The apparent stiffness of this PD controller—the amount of force required to displace the motor from various commanded equilibrium positions a few 0.01 mm—was measured at 90 Nt/mm (450 lb/in). This is comparable with micro-stepping methods, although not quite as good. The transient response is quite good.

In FIG. 8 the result of commanding a 300 mm (6 inch) move under direction of AML at a speed of 0.5 m/sec (20 inch/sec) and acceleration/deceleration of 10 m/sec/sec (1 g). The error between the position goal, $x_d$, and the actual position at each instant nowhere exceeds 5 mm (0.2 inch).

In another application, a PID controller is servoing the uncoupled phase motor to zero error on a 0.002 mm (0.00008 inch) resolution encoder, with a similar transient response.

CONTROL PROGRAMS

Derivative of Polynomial for Velocity Estimate

While fitting a polynomial and taking a derivative is not an optimum solution to estimating the velocity, it is expedient and requires no modelling of the motor. The first order polynomial's derivative, the slope of the straight line fitting the data $x_k$ and $x_{k-1}$, is often good enough, but higher order approximations where found to work better.

A formula for evaluating the derivative for the unique quadratic through the data $x_k$, $x_{k-1}$, $x_{k-2}$ is:

$$3x_k - 4x_{k-1} + x_{k-2}.$$

The equivalent formula for the cubic interpolate is $$11x_k - 18x_{k-1} + 9x_{k-2} - 2x_{k-3}.$$

Each of these formulae provides a signal roughly proportional to the velocity.

Square root computation

Computing a square root in 68000 assembler is not at all difficult. A good initial guess combined with a few Newton-Raphson iterations complete the process. The procedure is outlined here.

1. An initial guess.

Let n be the index of the highest order non-zero bit in the binary representation of the value of $U \geq 0$. For example, suppose $U=57$ (decimal). Then $n=6$ The value of n approximates the logarithm of U, hence n/2 is approximately the logarithm of $\sqrt{U}$. A reasonable first guess to start the process of finding the square root of U is $$u^0 = 2^{n/2}, \text{ or } 2^{(n-1)/2} \text{ if n is odd.}$$

For our example of 57, the first guess then is 8. In general this initial approximation is within a factor of $\sqrt{2}$ of the exact square root.

2. Newton-Raphson Iteration.

A recursive iteration for the square root is $$u^{i+1} = (U/u^i + u^i + 1)/2$$

For 32 bit integer numbers, the above guess coupled with 3 iterations is sufficient to compute the square root to integer precision (16 bit result).

Commutation logic for a coupled motor

The following is the commutation logic required by a magnetically coupled phase stepper motor. The added complexity compared to an uncoupled phase motor is a result of the magnetic coupling between the motor phases which requires the motor to go through twelve half-steps (two cardinal steps) to return to the same direction of magnetix flux. Thus the added complexity is:

1. Two logical variables are needed for each coil to designate the magnetic flux direction; e.g. for coil AA' in FIG. 1 logical variable A is used to designate if "up" direction flux is on or off; while logical variable $\overline{A}$ is used to designate if "down" direction flux is on or off.

2. Four states (labeled with the two logical variables: T1, T2) are needed to keep track of the twice repeated six half-steps cycle. Variables ST1 (ST2) are used to force T1 (T2) to logic 1 (Set), while CT1 (CT2) are used to force T1 (T2) to logic 0 (Clear).

$$A = F\overline{B}C\overline{T2} + \overline{F}BCT1$$

$$B = \overline{F}CA\overline{T2} + FC\overline{A}T1$$

$$C = F\overline{A}\overline{B}T1 + \overline{F}AB\overline{T2}$$

$$\overline{A} = \overline{F}\overline{B}CT2 + FBC\overline{T1}$$

$$\overline{B} = FC\overline{A}T2 + \overline{F}CA\overline{T1}$$

$$\overline{C} = \overline{F}\overline{A}BT1 + \overline{F}AB T2$$

The states T1 and T2 are updated according to:

$$ST1 = AB\overline{BC}\overline{CA}T2 + A\overline{B}B\overline{C}CA\overline{T2}$$

$$ST2 = \overline{A}BBC CA\overline{T1} + \overline{A}BBC\overline{C}A T1$$

$$CT1 = AB\overline{BC}\overline{CA}\overline{T2} + A\overline{B}B\overline{C}CAT2$$

$$CT2 = \overline{A}BBCCA T1 + \overline{A}BBC\overline{C}A\overline{T1}$$

Advantages of The Electromagnetic Actuator System

Important differences between the electromagnetic actuator system of this invention and prior systems are the use of the three phase D.C. sensor, the MRs, which directly produce the commutation when processed by the commutation logic. There is no need for demodulation nor is there need for a counting of pulses (and potentially miscounting) to achieve position measurement and correct commutation. The MRs and comparators produce the necessary signals for commutation directly; there is no need of an initial motion for alignment to establish the correct commutation. The correct commutation is established the instant power is turned on.

Secondly, correcting for the square law non-linearity coupled with the overlapping energization of coils greatly improves the performance. There seems to be little need for further correcting the remaining torque ripple. Since the decision about which coil to enable is handled by the commutator, much of the burden of controlling a step motor has been removed. The control of a commutated step motor is analogous to an ordinary D.C. servo motor. There are some important advantages to such an approach:

The stepper motor is no longer restricted to move in steps or half-steps.

Commutation provides a simpler means of positioning between cardinal steps than does conventional micro-stepping. The motor's positional accuracy is determined by position feedback and the quality of the control system's design.

The closed loop control is simple.

A single input, a direction and a magnitude of a voltage, provides acceleration in a desired direction, independent of the motor's position. Thus even simple control laws (e.g. PID) can achieve high performance.

More flexible control objectives such as position, velocity, and force control can be achieved.

The motor cannot lose synchrony.

Since the commutator automatically enables the proper coils to generate force in the desired direction, the problem of missed timing of steps at high speeds in conventional step motor controls does not appear. The motor always applies force in the prescribed direction even if perturbed by a sudden change in load.

The motor will not come to rest in the wrong equilibrium position.

The control law defines the equilibrium position. If displaced the motor will return to the intended equilibrium. With conventional stepping methods, the motor will come to rest at any of multiple equilibria.

The motor will not "run away".

Commutation with phase advance guarantees that the motor will not race away at high speed if perturbed.

Power dissipation is lowered by one or two orders of magnitude.

Power is expended only when there is a position error. When the motor settles near or at its desired position, no or very little control voltage is applied. In contrast, micro-stepping or traditional stepping requires large currents flowing all the time.

Overlapping the coil energization by alternating between one and two coils reduces the force ripple as the motor's position changes.

The low torque ripple helps simple control strategies achieve high precision.

Improvements

Some obvious improvements can be made by programming the computer to compensate for known operational nonlinearities in the individual stepper motor, such as temperature rise characteristics, or inherent operational nonlinearities which affect the particular type of stepper motor, for example the known square-law characteristics of the variable reluctance type of stepper motor.

Torque ripple compensation.

The system can sense position and adjust power amplifier gain to eliminate the remaining torque ripple as a function of position. A ROM or the MR's directly can provide the compensation as a function of position.

Better control design.

Modelling the commutated motor may lead to improved control law design, incorporating classical design techniques (lead-lag compensation) and modern techniques (observers), and specially customized control laws for replacement motors or for special jobs.

A more continuous advance.

It is simple to build a commutator with an advance that has twice the resolution of the one described here. Such a commutator would achieve improved force at high speed.

While the invention has been embodied and described as an actuator to control a linear robot, it is obvious that one skilled in the art may alter it in form and detail for use in other activities, such as the use of a variable resistance stepper motor, with its high torque and low inertia, to take the place of ordinary DC servo motors where these characteristics are at a premium. As VR step motors are inherently inexpensive to build, and can clearly be controlled to a high degree of precision, it is conceivable that they might replace many permanent magnet DC motors. And of course any application where stepping motors are now used is a potential candidate for this method, if the cost of sensing position is justified.

What is claimed is:

1. An electromagnetic actuator system characterized by
   (a) a stepper motor (11-12) having a plurality of windings (A,B,C);
   (b) power means (20), connected to said windings (A,B,C), to supply power to said windings;
   (c) coil switching means (15), connected to said windings (A,B,C) to complete when selected the enabling circuit from said power means (20) through the selected enabled coil upon activation;
   (d) means (14), having a plurality of input nodes, to provide position and anomaly corrected switch selection signals as a composite function of a control direction signal and a pattern of present armature position signals to provide a related pattern of enabling coil selection signals to said coil switching means (15); and
   (e) position sensing means (13), monitoring the armature (12) position of said stepper motor and feedback connected to said programmable logic means (14) to provide a pattern of present armature position signal inputs to said means (14) to provide position and anomaly corrected switch selection signals.

2. An electromagnetic actuator system further characterized by (a) a stepper motor (11–12) having a plurality of windings (A,B,C)
(b) power means (20), connected to said windings (A,B,C), to supply to said windings;
(c) coil switching means (15), connected to said windings (A,B,C) to complete when selected the enabling circuit from said power means (20) through the selected enabled coil upon activation;
(d) means (14), having a plurality of input nodes, to provide position and anomaly corrected switch selection signals as a composite function of a control direction signal and a pattern of present armature position signals to provide a related pattern of enabling coil selection signals to said coil switching means (15); and
(e) position sensing means (13), monitoring the armature (12) position of said stepper motor and feedback connected to said programmable logic means (14) to provide a pattern of present armature position signal inputs to said means (14) to provide position and anomaly corrected switch selection signals;
(f) a microprocessor (24), feedback connected to said position sensing means (13) to receive present position inputs, connected to said power means (20) to provide a single amplitude-variable control direction signal, and connected to said means (14) to provide control direction (F) and phase advance (U) signals.

3. An electromagnetic actuator system according to claim 2 further characterized in that said position sensing means (13) provides digital coarse armature position feedback signals (lines 22) and analog fine armature position feedback signals (lines 23) to said microprocessor (24), and said microprocessor (24) provides control amplitude (U), control direction (F) and phase advance signals (D/O) to said means, (14) whereby correction is carried out according to programmed computation by said microprocessor (24).

4. An electromagnetic actuator system according to claim 2 further characterized in that said control computer programming operates with a linear control law to provide control amplitude $U_k$ and also includes programming for square-law compensation, which provides the formula $$u_k = \text{sign}(U_k)\sqrt{|U_k|}$$

to said power means (20).

* * * * *